(12) United States Patent
Johns (10) Patent No.: US 8,511,249 B1
(45) Date of Patent: Aug. 20, 2013

(54) POINTER ARRANGEMENT FOR MARKING TUBES IN A SHELL AND TUBE HEAT EXCHANGER

(75) Inventor: Clifford L. Johns, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 471 days.

(21) Appl. No.: 12/882,694

(22) Filed: Sep. 15, 2010

Related U.S. Application Data (60) Provisional application No. 61/245,079, filed on Sep. 23, 2009.

(51) Int. Cl.
*G01C 15/02* (2006.01)
*F16L 55/10* (2006.01)

(52) U.S. Cl.
USPC ........... 116/201; 138/89; 116/294; 29/890.03

(58) Field of Classification Search
USPC ................ 116/200, 201, 209, 287, 294, 298, 116/306, 307, 309, 325, DIG. 6; 138/104, 138/89; 29/890.03; 40/673, 299.01, 309, 40/331, 662, 663.913; 411/24–28, 907
See application file for complete search history.

(56) References Cited

U.S. PATENT DOCUMENTS

| | | | |
|---|---|---|---|
| 3,223,490 A | 12/1965 | Sacken | |
| 4,114,654 A * | 9/1978 | Richardson | 138/89 |
| 4,312,708 A * | 1/1982 | Leslie | 376/203 |
| 4,442,716 A | 4/1984 | Coe et al. | |
| 4,493,344 A * | 1/1985 | Mathison et al. | 138/89 |
| 5,114,685 A | 5/1992 | Sapoff | |
| 5,439,103 A | 8/1995 | Howes | |
| 5,625,347 A | 4/1997 | MacLean et al. | |
| 5,771,835 A * | 6/1998 | Schneider | 116/209 |
| 6,170,530 B1 * | 1/2001 | Steblina | 138/89 |
| 6,409,977 B2 | 6/2002 | Harper et al. | |
| 6,694,802 B1 | 2/2004 | Comardo | |
| 6,905,660 B2 | 6/2005 | Haraper et al. | |
| 6,981,404 B2 | 1/2006 | Johns et al. | |
| 7,285,251 B2 | 10/2007 | Johns et al. | |
| 7,364,089 B2 | 4/2008 | Claessens et al. | |
| 7,765,948 B2 | 8/2010 | Johns et al. | |
| 2006/0162724 A1 * | 7/2006 | Scarrott et al. | 128/200.23 |
| 2007/0098605 A1 | 5/2007 | Johns et al. | |
| 2008/0111685 A1 | 5/2008 | Olson et al. | |
| 2008/0142045 A1 | 6/2008 | Johns et al. | |

(Continued)

FOREIGN PATENT DOCUMENTS

| | | |
|---|---|---|
| DE | 102005027060 | 12/2006 |
| EP | 0311712 | 4/1989 |

(Continued)

OTHER PUBLICATIONS

Title: "A Wet Paint Sign," Author: Shaliya waya, Date:Aug. 2, 2009, Source: Wikipedia <http://en.wikipedia.org/wiki/File:Wetpaint.jpg>, accessed Feb. 2013.*

Primary Examiner — David Bryant
Assistant Examiner — Jacob Cigna
(74) Attorney, Agent, or Firm — Camoriano & Associates; Theresa Camoriano (57) ABSTRACT

A method for marking a first tube in a shell and tube heat exchanger includes inserting a directional pointer into a second tube and directing the directional pointer toward the first tube.

6 Claims, 8 Drawing Sheets

(56) References Cited

U.S. PATENT DOCUMENTS

| | | |
|---|---|---|
| 2008/0184779 A1 | 8/2008 | Johns et al. |
| 2008/0302388 A1 | 12/2008 | Johns et al. |
| 2009/0095211 A1 | 4/2009 | Johns et al. |
| 2009/0097958 A1 | 4/2009 | Johns et al. |
| 2009/0145727 A1 | 6/2009 | Johns |
| 2010/0059137 A1 | 3/2010 | Johns et al. |
| 2012/0137517 A1* | 6/2012 | Johns et al. ............... 29/890.03 |

FOREIGN PATENT DOCUMENTS

| | | |
|---|---|---|
| EP | 1967260 | 9/2008 |
| GB | 725860 | 3/1955 |
| GB | 1311434 | 3/1973 |

* cited by examiner

POINTER ARRANGEMENT FOR MARKING TUBES IN A SHELL AND TUBE HEAT EXCHANGER

This application claims priority from U.S. Patent Application Ser. No. 61/245,079, filed Sep. 23, 2009, which is hereby incorporated herein by reference.

BACKGROUND

The present invention relates to shell and tube heat exchangers and, in particular, to an arrangement for marking specific tubes, for example tubes that need to be repaired or otherwise corrected. Shell and tube heat exchangers that are used as chemical reactors may have many thousands of open-ended tubes. Various methods have been used in the past to mark the tubes that need to be corrected. Usually, a marker has been inserted into the open end of the tube that needs to be corrected, but those markers can come loose when people walk on top of the tube sheet, and they require the marker to be removed in order to treat the tube. Also, when the marker is removed in order to correct the tube, the location of the tube may be lost.

SUMMARY

One embodiment of the present invention provides an arrangement by which one or more directional pointers are inserted into the open ends of one or more tubes adjacent to the tube that needs to be corrected, with the pointers being directed toward the tube that needs to be corrected. The directional pointer may be secured in place by a mechanism that requires the use of a special tool in order to reduce the opportunity for it to be removed accidentally or to be removed by someone who does not have authorization. It also may include an indicator to indicate the type of action that needs to be taken for the tube it is marking.

DETAILED DESCRIPTION

Figure 1:
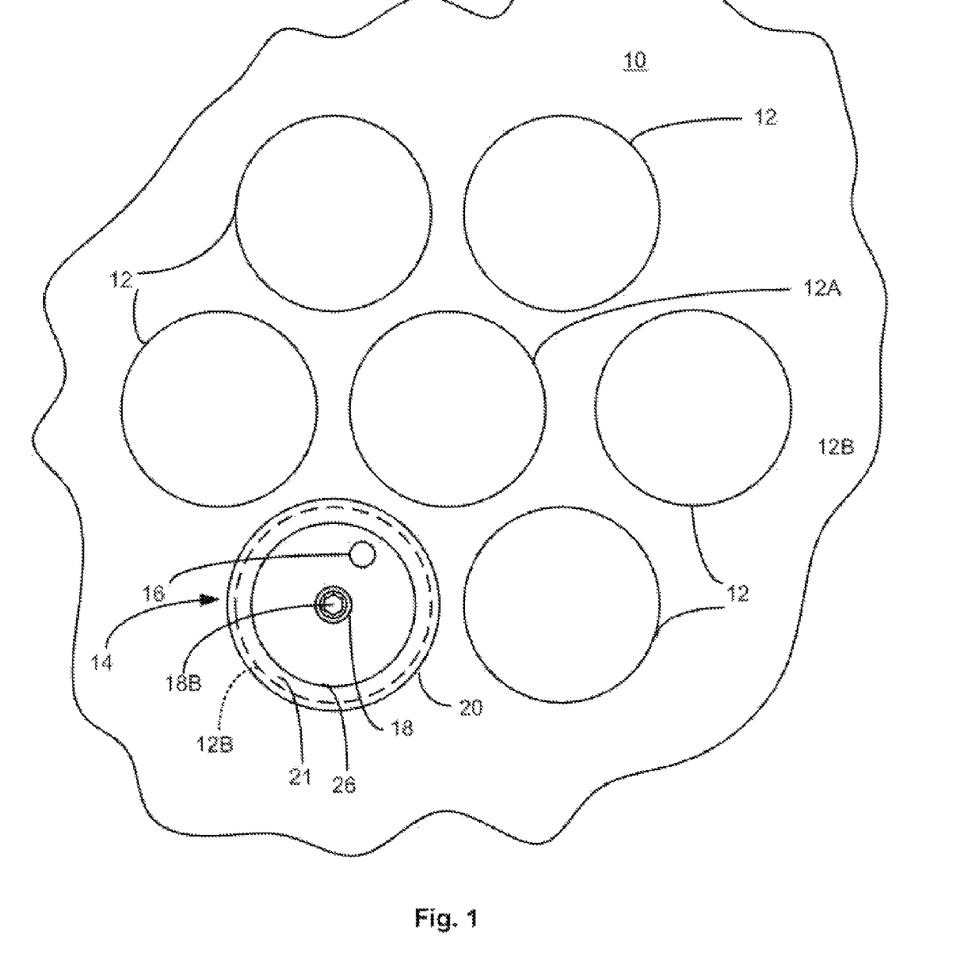
FIG. 1 is a broken away, schematic top view of a tube sheet in which a directional pointer has been inserted into a tube adjacent to a tube that requires correction.
Figure 1A:
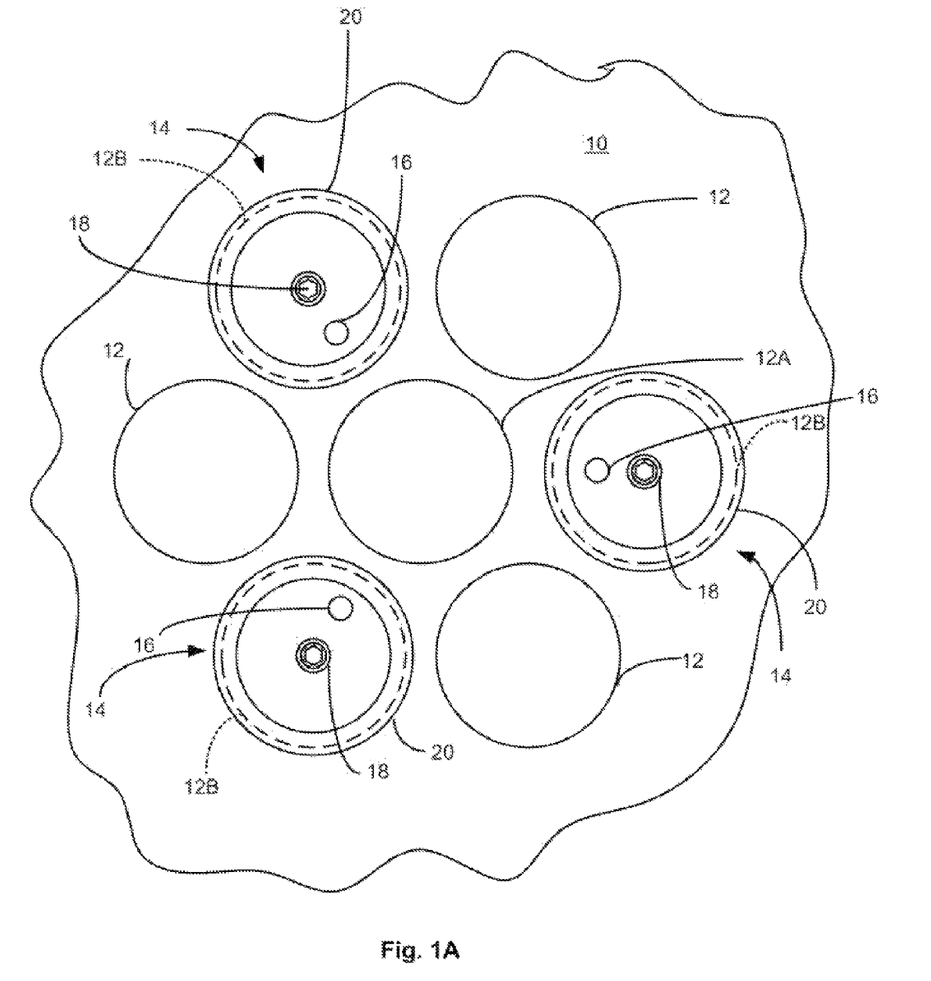
FIG. 1A is the same view as FIG. 1 but with three directional pointers inserted adjacent to a tube that requires correction.

FIG. 1 is a broken-away, schematic top view of the top tube sheet 10 of a vertical tube shell and tube heat exchanger, showing a plurality of tubes 12. In this case, the tube 12A needs some type of attention. For example, it may have been found in a back pressure test to have a back pressure that is too high or too low, indicating some type of problem with the catalyst loading that needs to be corrected. A directional pointer 14 has been inserted into the tube 12B, which is adjacent to the tube 12A that needs to be corrected. That directional pointer 14 includes a directional indicator 16, pointing to the tube 12A that needs to be corrected. In this case, the directional indicator 16 is a small hole in the plate 26 that is offset in a radial direction from the longitudinal axis of the plate 26 (which is the same as the longitudinal axis of the directional pointer 14 and of the bolt 18).

As explained later, especially with respect to FIGS. 2-2B, it can be seen that the directional pointer 14 is secured in place by the radial expansion of a compressible cylindrical member 21, which is deformed due to compression exerted by a nut 22 threading up onto a bolt 18. This causes the cylindrical member 21 to compress in the axial direction and expand in the radial direction. The bolt 18 has a head 18A with a hexagonal-shaped recess 18B for receiving an Allen wrench having a hexagonal cross-section. Also, the directional pointer 14 includes a plate 20, having a diameter that is larger than the inside diameter of the tube 12B, so the plate 20 rests on the top surface of the tube sheet 10 and prevents the directional pointer 14 from falling into the tube 12B. All the open tubes 12, 12A, 12B have the same diameter, and there may be thousands of tubes secured to the tube sheet 10.

Figure 2:
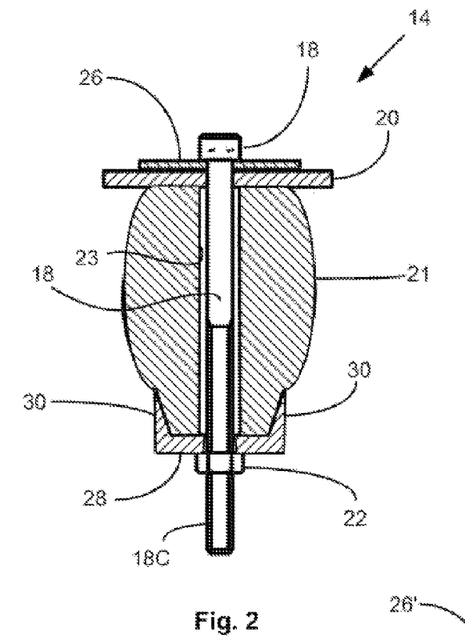
FIG. 2 is a front section view of the directional pointer of FIG. 1 in an expanded condition.
Figure 2A:
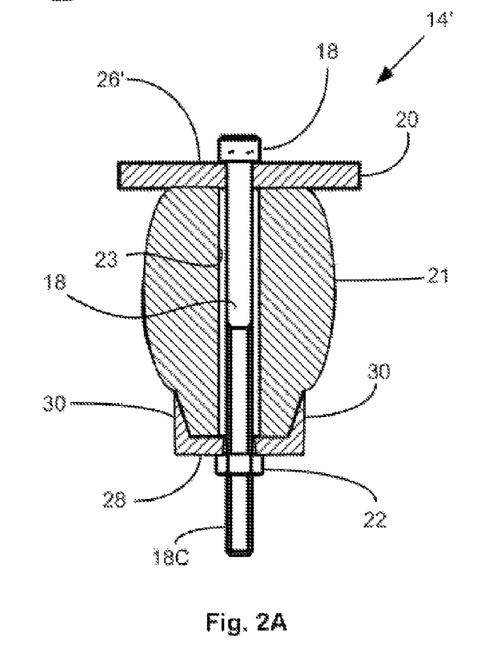
FIG. 2A is a front section view of an alternate embodiment of the directional pointer of FIG. 2.
Figure 2B:
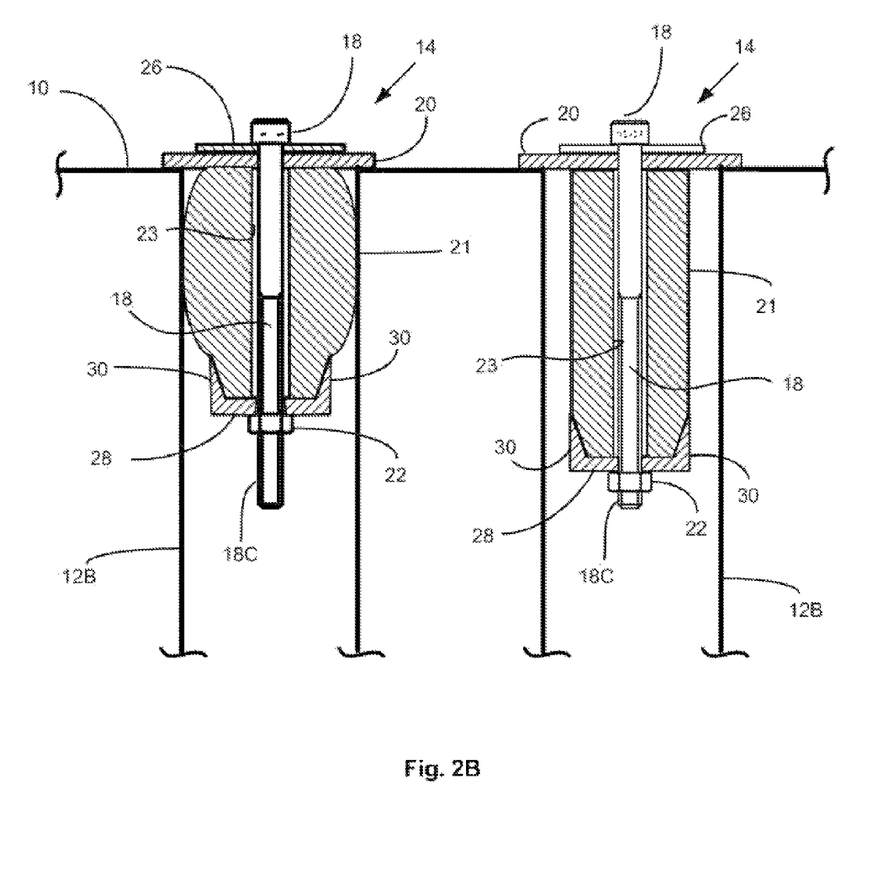
FIG. 2B is a front section view of two of the directional pointers of FIG. 2 inserted into tubes in a tubesheet, one directional pointer in an expanded condition and the other in a non-expanded condition.
Figure 3:
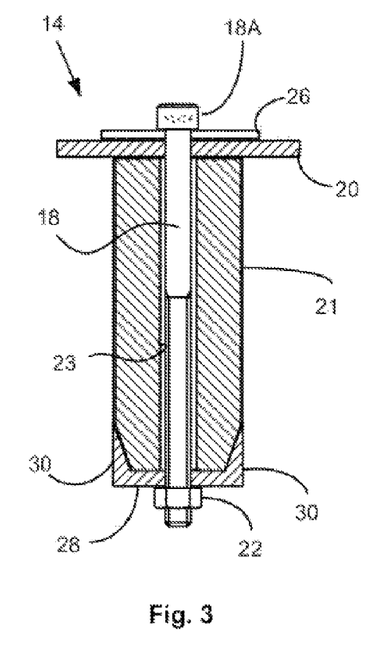
FIG. 3 is a front section view of the directional pointer of FIG. 2 in a non-expanded condition, before it is inserted into the tube.
Figure 4:
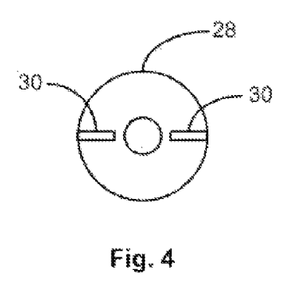
FIG. 4 is a top view of the toothed plate of the directional pointer of FIG. 2.

FIGS. 2, 2B, and 3 show the directional pointer 14 in more detail. FIG. 2 and the left side of FIG. 2B show the directional pointer 14 in an expanded condition, in which it exerts a radially outwardly-directed force against the inner wall of the tube 12B. This secures the directional pointer 14 in the tube 12B. FIG. 3 and the right side of FIG. 2B show the directional pointer 14 in a non-expanded condition, before it has been secured in the tube 12B.

Figure 5:
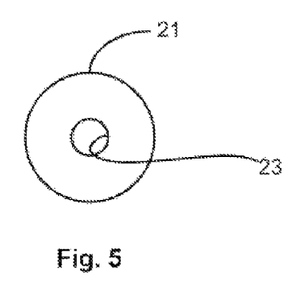
FIG. 5 is a top view of the rubber cylinder of FIG. 3.

The directional pointer 14 includes a cylindrical compressible member 21 (made of rubber or a flexible, rubbery type of material) defining an axial hole 23 (See also FIG. 5) extending from one end to the other. A cap bolt 18 extends through the axial hole 23 and has a threaded end 18C onto which a nut 22 has been threaded. As was explained earlier, the head 18A of the bolt 18 has a hexagonal-shaped recess 18B (shown in FIG. 1). Between the head of the bolt 18 and the compressible member 21 are a large washer or plate 20, having an outside diameter that is larger than the inside diameter of the tubes 12 and a directional indicator plate 26, having an outside diameter that is somewhat less than the outside diameter of the plate 20. At the other end of the bolt 18 is a toothed plate 28 with upwardly projecting teeth 30 that dig into the compressible member 21. The nut 22 is fixed to the plate 28 (or alternatively there is sufficient friction between the nut 22 and the bottom surface of the plate 28) so the nut 22 does not rotate relative to the plate 28 when the bolt 18 is being rotated, and since the plate 28 digs into the compressible member 21, the plate and nut also do not rotate relative to the compressible member 21. This enables the user to tighten the nut 22 up onto the bolt 18 just by rotating the head of the bolt 18. At first, the loose fit between the bolt 18 and the opening 23 and the mass of the compressible member 21 prevent the compressible member 21 from rotating as the bolt is tightened, and then, as the compressible member 21 moves to its expanded state, in which it presses against the inner wall of the tube 12, the friction between the compressible member 21 and the inner wall of the tube 12 prevents the compressible member 21 (and the toothed plate 28 and the nut 22) from rotating.

When the bolt 18 is tightened (threaded into the nut 22), it causes the compressible member 21 to shorten axially and expand radially, so it presses against the inner wall of the tube 12B, causing the directional pointer 14 to be secured within the tube 12B.

If desired, the plate 20 may be secured to the compressible member 21, which would allow the worker to prevent the compressible member 21 from rotating while he is rotating the bolt 18 simply by holding the plate 20 with one hand as he rotates the bolt 18 with the other hand.

Figure 7:
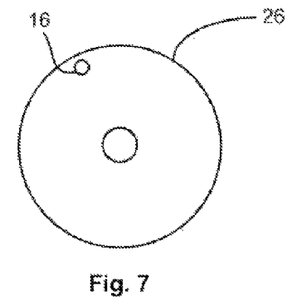
FIG. 7 is a top view of the directional pointer plate of FIG. 2.

The directional indicator plate 26 may have a variety of configurations. It may have a small hole 16 offset from the axis to serve as a directional indicator as shown in FIGS. 1, 7 and 9. The hole 16 is offset radially from the axis of the directional indicator plate 26, indicating a direction from the axis to the hole 16 which serves as a pointer that can be used to point toward the tube 12A that needs correction, as illustrated in FIG. 1. Instead of a hole 16, the directional indicator plate 26" may have a small nick or indentation 16" as shown in FIG. 8, or some other reference mark (not shown).

The directional indicator plates 26 also may be made in various colors, with each color indicating a different type of condition within the tube 12A to be corrected. For example, red may indicate that the pressure in the tube was too high, and yellow may indicate that the pressure in the tube was too low, and violet may indicate that the height of catalyst in the tube was too low.

Figure 8:
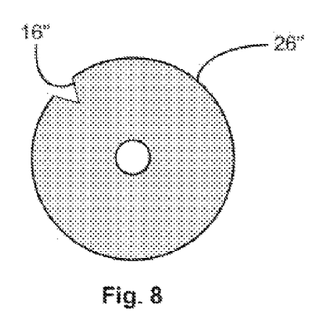
FIG. 8 is a top view of another alternative directional pointer plate.
Figure 9:
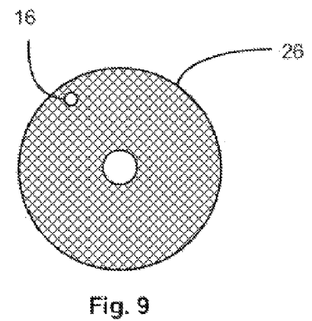
FIG. 9 is a top view of another alternative directional pointer plate.
Figure 10:
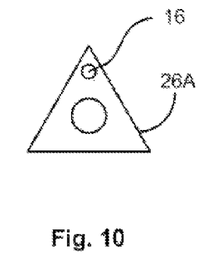
FIG. 10 is a top view of another alternative directional pointer plate.
Figure 11:
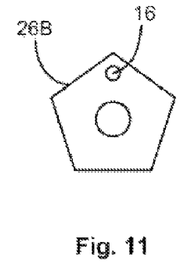
FIG. 11 is a top view of another alternative directional pointer plate.
Figure 12:
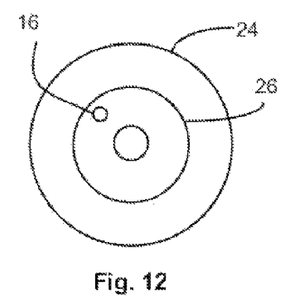
FIG. 12 is a top view of the directional pointer plate of FIG. 7 on an assembled directional pointer.
Figure 13:
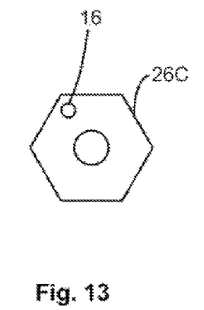
FIG. 13 is a top view of another alternative directional pointer plate.
Figure 14:
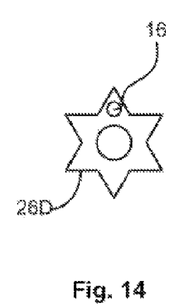
FIG. 14 is a top view of another alternative directional pointer plate.
Figure 15:
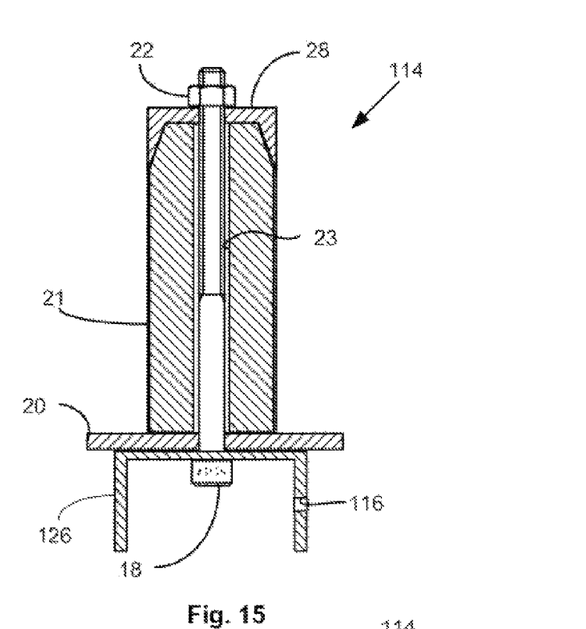
FIG. 15 is a front section view of another alternative directional pointer.
Figure 16:
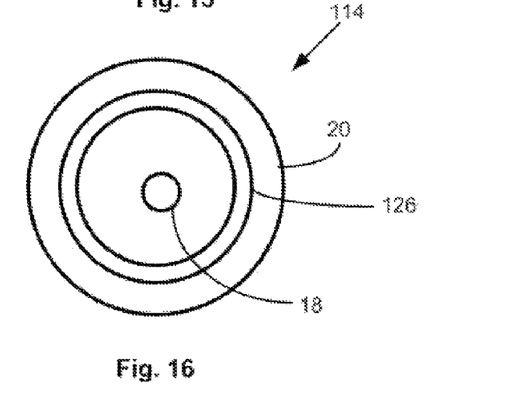
FIG. 16 is a bottom view of the directional pointer of FIG. 15.

Instead of using color to indicate the type of correction that is needed, the directional indicator plate 26" may be textured, as shown in FIG. 8, or may have a certain pattern to indicate the type of correction, as shown in FIG. 9.

Figure 6:
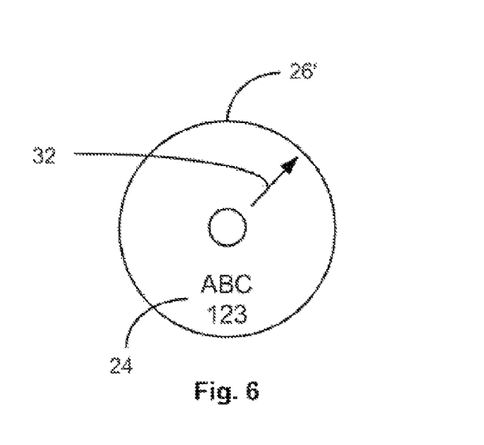
FIG. 6 is a top view of an alternate directional pointer plate for the directional pointer of FIG. 2.

The plate 26', shown in FIG. 6, does not have a hole to serve as a directional indicator or pointer but instead has markings 24 on its top surface that may serve both as a pointer and as an indication of the type of correction that is needed. Those markings may be engraved, printed, or even hand-applied using a pencil, an indelible pen, a piece of tape, or the like.

FIGS. 10, 11, 13 and 14 show various directional indicator plates 26A-D that have different shapes to indicate the type of correction that is needed.

One example of how these directional pointers 14 may be used is after a vertical tube chemical reactor has been loaded with catalyst and has been pressure tested. These directional pointers 14 may then be installed to indicate which tubes had a back pressure that was too high, which tubes had a back pressure that was too low, which tubes need to be plugged, and so forth. The directional pointers 14 are installed by a person who has the special tool that can fit into the hex recess of the head of the bolt 18. This tool usually is L-shaped and has a cross-section that matches the hexagonal recess, with both legs of the L being long enough that the tool cannot fall into one of the tubes 12. Also, the directional pointers 14 are made so they will not come apart so there will be no loose parts that could fall into one of the tubes 12.

When using the directional pointers 14, the installer installs the directional pointer 14 in a tube 12B that is adjacent to the tube 12A that needs to be corrected, and he installs it with the pointer 16 directed toward the tube 12A that needs correction, so that the tube 12A becomes the "marked tube", that is, the tube toward which the pointer on the directional pointer 14 is pointing. He tightens the directional pointer 14 with the special tool so the pointer 16 cannot be rotated relative to the tube 12B, and the directional pointer 14 cannot be removed from the tube 12B by someone who does not have authorization to carry one of the special tools. This means that the directional indicator 16 will be directed toward the tube 12A until an authorized person comes with the special tool to rotate the bolt 18 in the opposite direction, moving the compressible member 21 to a less expanded condition, and allowing the directional pointer 14 to be removed from the tube 12B. (While a hexagonal recess is shown here, there are various known types of driving arrangements that require special tools that could be used instead, such as star-shaped, and so forth.)

The directional pointer 14 would remain in place (such as in tube 12B in FIG. 1) as the corrections are being made so the person making the corrections does not lose track of the tube 12A being corrected. Once the corrections are made, the directional pointer 14 may also be used to help a worker find the corrected tubes so they can be re-tested.

After the tubes have been corrected and retested, a person with authorization to carry the special tool would then go around and remove the directional pointers 14.

It should be noted that it also would be possible to use the directional pointer 14 to provide further indication of activities that have occurred relating to the marked tube 12A. For example, a worker may use an indelible pen to mark on top of the plate 26 to indicate that the marked tube has been corrected or that it has been retested. The marking may be a symbol such as a check-mark "√" or a number sign, "#", a letter, such as "C" for "corrected" and "R" for "retested", a shape, such as an unfilled-in triangle or a filled-in square, or different colors, such as a blue mark to indicate that a correction has been done and a green mark to indicate that the tube has been retested, or anything else that will tell the workers what has been done to the marked tube.

Figure 18:
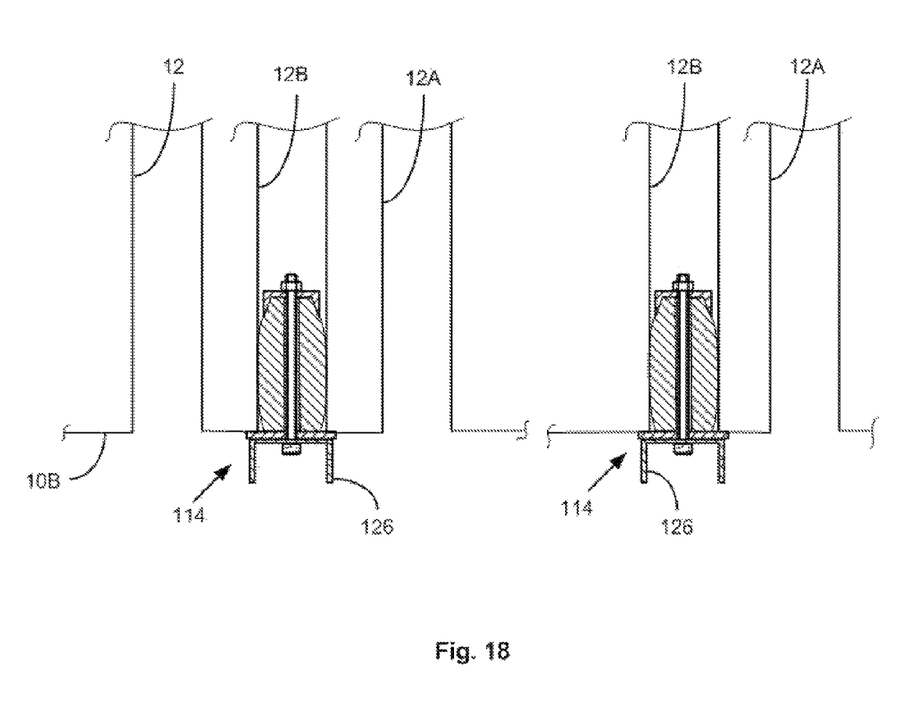
FIG. 18 is a schematic view showing the directional pointers of FIG. 15 being used on the bottom of a vertical tube shell and tube heat exchanger.

While FIG. 1 shows the directional pointers 14 being used on the top tube sheet 10 to mark the tops of the tubes 12, it also may be helpful to mark the bottom of the tubes 12 at the bottom tube sheet 10B, as shown in FIG. 18. In that case, the directional indicator plate 126 may be used in a directional pointer 114 that is otherwise very similar to the directional pointer 14. This directional indicator plate 126 differs from the original directional indicator plate 26 in that it has a cylindrical shape so it projects axially beyond the washer 20 and therefore can be seen more easily by a worker walking along the ground or on a platform below the reactor. This directional indicator plate 126 also has a hole 116 through the side wall which serves as a directional indicator or pointer.

Figure 17:
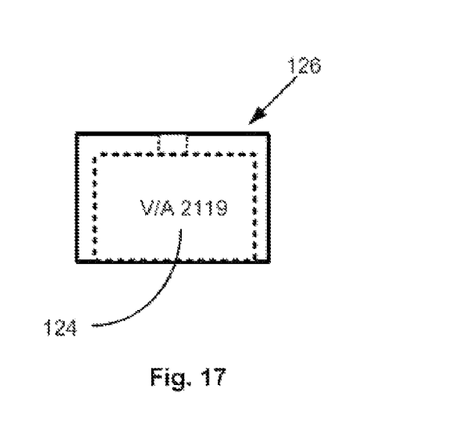
FIG. 17 is a front view of the cap of the directional pointer of FIG. 15.

The directional indicator plate 126 may also have identification markings 124 as shown in FIG. 17 instead of, or in addition to the opening 116. It also may be made in a color or have a texture or marking or other indication of the type of correction that needs to be made. In general, it may have all the same features as the directional indicator plate that is used on the top of the tubesheet 10.

These directional pointers 114 are inserted into the bottom of the tubes 12B and point toward the adjacent tubes 12A that need to be corrected. A flag, streamer, or tag (not shown) may be tied to the directional pointer 114, for example by threading a streamer through the opening 116, to make the directional pointer 114 easier to see. The markings 124 may refer to the condition of the tube 12A to be corrected, or to some other characteristic of interest, such as the location of the tube 12B or of the tube 12A to be corrected.

Referring back briefly to FIG. 6, a line 32 (or some other reference mark) may be added by the user onto the directional indicator plate 26', either before or after the directional pointer 14 has been installed in the tube 12B. The line 32 may be added to the plate 26' by the user with a pencil, pen, decal, or other mechanism after the directional pointer has been installed and secured in the reactor tube. In this instance, there is no need to align the directional indicator of the directional pointer 14 with the tube 12A to be corrected before tightening the directional pointer 14' in place, since the line 32 is used instead as the directional indicator and this line 32 can be applied after the directional pointer is installed in the tube 12B. It also should be noted that it may be desirable for the directional indicator plate 26' to be the same as the plate 20 that rests on the tubesheet rather than using a separate plate.

It will be obvious to those skilled in the art that modifications may be made to the embodiments described above without departing from the scope of the present invention.

What is claimed is:

1. A method for marking a tube in a shell and tube heat exchanger that includes a plurality of open-ended tubes, comprising the steps of:

identifying a first tube that is to be marked;

identifying a second tube adjacent to said first tube, said second tube defining an open end;

inserting a directional pointer into the open end of the second tube, with the directional pointer including a directional indicator; and securing the directional pointer in the second tube with said directional indicator being directed toward the first tube and being visible from outside the second tube.

2. A method for marking a tube in a shell and tube heat exchanger as recited in claim 1, wherein said directional pointer includes a cylindrical shaped body made of a compressible material; and wherein the step of inserting the directional pointer into the open end of the second tube is conducted when the cylindrical shaped body is in a first condition, and the step of securing the directional pointer in the second tube includes moving the cylindrical shaped body to a second, more expanded condition, in which it exerts an outward force against the inner wall of the second tube.

3. A method for marking a tube in a shell and tube heat exchanger as recited in claim 2, wherein the step of moving the cylindrical shaped body to the more expanded condition includes extending a bolt axially through the cylindrical shaped body, said bolt defining first and second ends, and tightening a nut onto the second end of the bolt to compress the cylindrical shaped body axially and expand the cylindrical shaped body radially.

4. A method for marking a tube in a shell and tube heat exchanger as recited in claim 3, wherein the directional indicator includes a directional indicator plate through which the bolt extends and a directional marking on the directional indicator plate.

5. A method for marking a tube in a shell and tube heat exchanger as recited in claim 3, wherein the nut is sufficiently secured to the cylindrical body to prevent the nut from rotating relative to the cylindrical body when the bolt is rotated.

6. A method for marking a tube in a shell and tube heat exchanger as recited in claim 5, wherein the directional indicator includes a directional indicator plate through which the bolt extends and a directional marking on the directional indicator plate.

* * * * *